United States Patent
Marupaduga et al.

(10) Patent No.: US 11,464,068 B1
(45) Date of Patent: Oct. 4, 2022

(54) SELECTION OF ACCESS NODE TO SERVE A DEVICE, WITH THE SELECTION BEING BASED ON RRC CONNECTION ESTABLISHMENT FAILURE HISTORY AS TO AT LEAST ONE OTHER DEVICE

(71) Applicant: Sprint Spectrum L.P., Overland Park, KS (US)

(72) Inventors: Sreekar Marupaduga, Overland Park, KS (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 44 days.

(21) Appl. No.: 17/249,262

(22) Filed: Feb. 25, 2021

(51) Int. Cl.
*H04W 76/27* (2018.01)

(52) U.S. Cl.
CPC .................................. *H04W 76/27* (2018.02)

(58) Field of Classification Search
CPC ........................................................ H04W 76/27
See application file for complete search history.

(56) References Cited

U.S. PATENT DOCUMENTS

| | | | |
|---|---|---|---|
| 8,744,439 B2 | 6/2014 | Deivasigamani et al. | |
| 2014/0148169 A1* | 5/2014 | Li | ..................... H04W 36/08 455/437 |
| 2016/0302151 A1 | 10/2016 | Jung et al. | |
| 2020/0053817 A1* | 2/2020 | Hayashi | ................. H04B 7/043 |
| 2020/0145859 A1 | 5/2020 | Nair | |

FOREIGN PATENT DOCUMENTS

| | | | | |
|---|---|---|---|---|
| JP | 2001268616 | 9/2001 | | |
| WO | WO-2019118842 A1 * | 6/2019 | ........... H04B 17/318 |

* cited by examiner

*Primary Examiner* — Farid Seyedvosoghi (57) ABSTRACT

A method and system for controlling connectivity in a wireless communication system that includes a first cell and a second cell, when the first cell and the second cell are both candidates to serve a given user equipment device (UE). An example method includes determining a first Radio-Resource-Control (RRC)-connection-establishment failure rate of the first cell, where the first RRC-connection-establishment failure rate of the first cell is based on one or more instances of RRC-connection-establishment failure experienced in the first cell. And the method includes using at least the determined first RRC-connection-establishment failure rate of the first cell as a basis to control whether the given UE will be connected with the first cell or rather with the second cell. Further, in this method, the one or more instances of RRC-connection-establishment failure experienced in the first cell encompass RRC-connection-establishment failure experienced by one or more UEs other than the given UE.

20 Claims, 4 Drawing Sheets

---

DETERMINE A FIRST RRC-CONNECTION-ESTABLISHMENT FAILURE RATE OF A FIRST CELL, WHERE THE FIRST RRC-CONNECTION-ESTABLISHMENT FAILURE RATE OF THE FIRST CELL IS BASED ON ONE OR MORE INSTANCES OF RRC-CONNECTION-ESTABLISHMENT FAILURE EXPERIENCED IN THE FIRST CELL BY ONE OR MORE UEs OTHER THAN A GIVEN UE — 32

USE AT LEAST THE DETERMINED FIRST RRC-CONNECTION-ESTABLISHMENT FAILURE RATE OF THE FIRST CELL AS A BASIS TO CONTROL WHETHER THE GIVEN UE WILL BE CONNECTED WITH THE FIRST CELL OR RATHER WITH A SECOND CELL — 34

SELECTION OF ACCESS NODE TO SERVE A DEVICE, WITH THE SELECTION BEING BASED ON RRC CONNECTION ESTABLISHMENT FAILURE HISTORY AS TO AT LEAST ONE OTHER DEVICE

BACKGROUND

A typical wireless communication system includes a number of access nodes that are configured to provide wireless coverage areas, referred to as cells, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the system could engage in air interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each cell could operate on a radio-frequency (RF) carrier, which could be frequency division duplex (FDD), defining separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth and a center frequency and thus extending from a low-end frequency to a high-end frequency.

Each carrier could be defined within an industry standard frequency band, by its frequency channel(s) being defined within the frequency band. Examples of such frequency bands include (i) bands 2, 4, 12, 25, 26, 66, 71, and 85, supporting FDD carriers (ii) band 41, supporting TDD carriers, and (iii) bands n258, n260, and n261, supporting FDD and TDD carriers, among numerous other possibilities. Further, each cell could have a physical cell identity (PCI) or the like that identifies the cell on the carrier, to help distinguish the cell from others cells that operate on the same carrier.

On the downlink and uplink, the air interface of each cell could be configured in a specific manner to define physical resources for carrying data (e.g., user-plane data and control-plane signaling) wirelessly between the access node and UEs.

Without limitation, for instance, the air interface of each cell could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), resource elements on the downlink and uplink respectively could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry synchronization signals, reference signals, system information, and other control signaling such as PRB-scheduling directives and acknowledgement messaging from the access node to UEs. And on the uplink, certain resource elements could be reserved to carry random-access signals and other control signaling such as PRB-scheduling requests, acknowledgement messaging, and channel-quality reports from UEs to the access node.

OVERVIEW

In example operation, when a UE enters into coverage of such a network, the UE could initially scan for and detect that a cell of an access node provides the strongest available coverage. And the UE could then engage in a process in an effort to connect with the access node in that cell.

In practice, for instance, the UE could first engage in random-access signaling with the access node to get the access node's attention and to establish uplink transmission timing, and the UE could then engaging in Radio Resource Control (RRC) signaling with the access node to establish an air-interface connection, e.g., RRC connection, through which the access node will then serve the UE in the cell.

More particularly, the UE could first transmit to the access node a random-access request, and the access node could responsively transmit to the UE a random-access response providing the UE with an initial uplink PRB grant that specifies allocated physical uplink shared channel (PUSCH) resources in which the UE could then transmit an RRC Connection Request. The UE could then transmit to the access node, in the allocated PUSCH resources, an RRC Connection Request, and the access node could responsively transmit to the UE an RRC Connection Setup message. And the UE could then responsively transmit to the access node an RRC Connection Setup Complete message, denoting completion of the RRC connection setup and thus completion of setup of an RRC connection for the UE.

Optimally once the UE successfully engages in the random-access messaging with the access node, the UE and the access node should then be able to successfully engage signaling to establish an RRC connection as well. However, for various reasons, such as fading, high air-interface load, limitations on quantity of RRC connections, or the like, the UE's RRC-connection-establishment process (e.g., transmission of an RRC Connection Request from the UE to the access node, transmission of an RRC Connection Setup message from the access node to the UE, and transmission of an RRC Connection Setup Complete message from the UE to the access node) may fail. And when that happens, the UE may then newly scan for coverage and repeat the process, which could pose latency and user-experience issues.

Failure of RRC connection establishment could occur in various ways. For instance, the failure could occur if the RRC-connection-establishment process does not finish within a maximum allowed time period and/or if particular message transmission in the process not succeed after a maximum allowed number of transmission attempts.

Further, when a UE has successfully connected with an access node in a given cell, a situation could arise where the UE works to re-connect with the access node. For instance, if the UE experiences radio link failure or other loss of synchronization with the access node, the UE may then newly engage in random-access messaging with the access node, receiving an initial uplink resource grant, and the UE and access node may then engage in an RRC-connection reestablishment process. In a representative RRC-connection-reestablishment process, the UE transmits to the access node an RRC Connection Reestablishment Request, the access node responsively transmits to the UE an RRC Connection Reestablishment response message, and the UE then transmits to the access node an RRC Connection Reestablishment Complete message.

But as with the initial RRC connection establishment, the UE's RRC connection reestablishment process could also fail, perhaps likewise because the process does not finish with a maximum allowed time period and/or because a particular message transmission within the process does not succeed after a maximum allowed number of transmission attempts.

The present disclosure stems from a recognition that, if an access node's cell tends to experience a great extent of RRC connection establishment failure, whether with initial RRC connection establishment and/or with RRC connection re-establishment, then that cell may be relatively undesirable for use to serve UEs—even UEs that were not the subject of the previous failures. Namely, if an access node's cell tends to experience a great extent of RRC connection establishment failure, then that may suggest a high likelihood that any given UE that attempts RRC connection establishment or reestablishment with the access node in that call may experience RRC connection establishment failure, and therefore that the cell may be relatively undesirable to serve that given UE.

The disclosure therefore provides for use of a cell's RRC-connection-establishment-failure history with respect to at least a first one or more UEs as a basis to control whether a second UE, not included in the first one or more UEs, will be served in that cell.

By way of example, this process could apply in a scenario where a UE detects threshold strong coverage respectively of each of two or more cells, such as two cells from a given access node or a first cell from a first access node and a second cell from a second access node, and where at issue is which cell the UE should connect in—perhaps as the UE's sole serving cell or as the UE's primary/anchor serving cell.

Normally in that scenario, the UE may select and connect in one of the detected cells based on which cell has the strongest detected coverage. But in accordance with the present disclosure, the UE could further or alternatively base the selection on consideration of RRC connection establishment failure history per cell. Alternatively or additionally, if the UE connects with an access node in a given cell and reports to the access node that the UE is also within threshold strong coverage of another cell, then, in accordance with the present disclosure, the access node could decide based on consideration of RRC connection establishment failure history per cell whether to transition the UE to be connected instead in the other cell.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

An example implementation will now be described in the context of a system supporting 4G LTE and/or 5G NR. But it should be understood that the disclosed principles could extend to apply in other scenarios as well, such as with other RATs, and with other network configurations, among other possibilities. More generally, it should be understood that other changes from the specific arrangements and processes described are possible. For instance, various described entities, connections, operations, and other elements could be added, omitted, distributed, re-located, re-ordered, combined, or changed in other ways. In addition, various operations described as being performed by one or more entities could be implemented in various ways, such as by a processing unit executing instructions stored in non-transitory data storage, along with associated circuitry or other hardware, among other possibilities.

Figure 1:
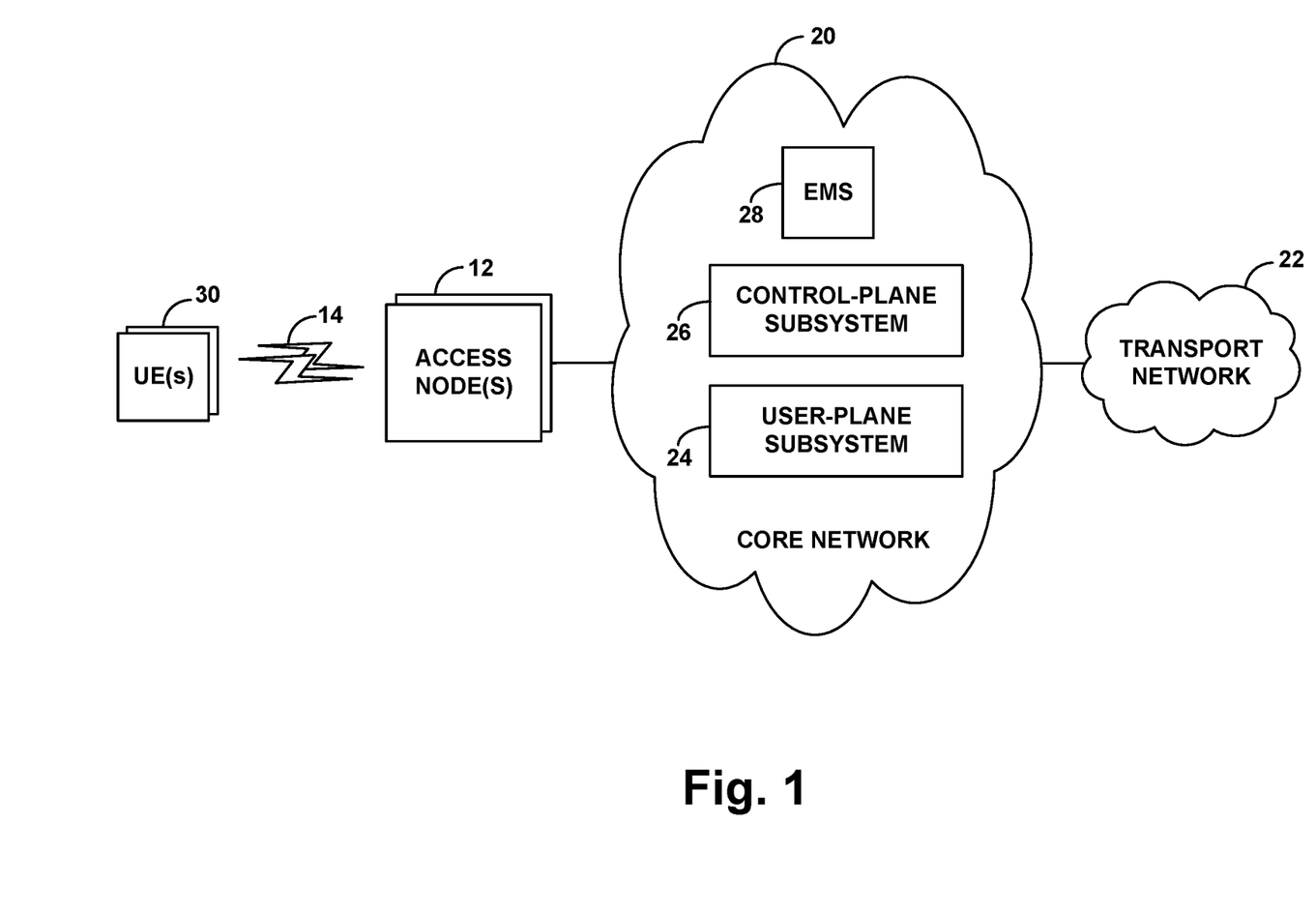
FIG. 1 is a simplified block diagram of an example network arrangement in which features of the present disclosure can be implemented.

Referring to the drawings, FIG. 1 is a simplified block diagram of an example network arrangement including one or more access nodes 12 configured to provide multiple cells 14. In this arrangement, a given access node 12 might provide multiple cells 14 and/or multiple access node 12 might each provide one or more respective cells 14.

Representative access nodes could take various forms. For instance, an access node could be a 4G LTE access node (e.g., evolved Node-B (eNB)) or 5G NR access node (e.g., next generation Node-B (gNB)), among other possibilities. Further, an access node could be a macro access node of the type configured to provide a wide range of coverage or could take other forms, such as a small cell access node, a relay, a femtocell access node, or the like, possibly configured to provide a smaller range of coverage.

Each cell provided by an access node could be defined on a respective carrier, which, as noted above, could be FDD or TDD and could be defined in a given frequency band, although multiple access nodes might operate on the same carrier as each other and provide different respective cells than each other. To provide coverage and service in such a cell, an access node could be equipped with a baseband unit, a radio head, and an antenna structure, among other components and logic.

The air interface of each such cell could be structured as described above by way of example, being divided over time into frames, subframes, and symbol time segments, and over frequency into subcarriers, thus defining an array of air-interface resource elements, which could be grouped and designated for particular use to carry data (including control-plane signaling and user-plane data) to or from served UEs. Though specifics could vary from RAT to RAT and/or based on other factors.

By way of example, on the downlink, certain resource elements per subframe could be generally reserved to define a physical downlink control channel (PDCCH) for carrying control signaling such as scheduling directives from the access node to served UEs, other resource elements per subframe could be generally reserved to define a physical HARQ channel (PHICH) for carrying acknowledgement signaling to served UEs, and other resource elements per subframe could be generally reserved to define a physical downlink shared channel (PDSCH) in which the resource elements could be grouped to define the PRBs noted above, allocable by the access node on an as needed basis to carry data communication from the access node to UEs.

Further, within these generally reserved groups of downlink resource elements, certain resource elements could be excluded and separately reserved for other use. For instance, certain resource elements could be reserved to carry synchronization signals that encode the cell's PCI and that UE's could detect as an indication of coverage and as a basis to establish frame timing. Further, other resource elements could be reserved to carry a cell-specific reference signal that UEs could evaluate in order to determine cell coverage strength, or synchronization signals could double as such a reference signal. Still further, certain resource elements could be reserved to carry system broadcast messages, such as a master information block (MIB) message and various system information block (SIB) messages.

Likewise, on the uplink, certain resource elements per subframe could be reserved to define an uplink control channel (PUCCH) for carrying control signaling such as scheduling requests from UEs to the access node, and other resource elements per subframe could be generally reserved to define a physical uplink shared channel (PUSCH) in which the resource elements could be grouped to define the PRBs noted above, allocable by the access node on an as needed basis to carry data communications from UEs to the access node.

And within these generally reserved groups of uplink resource elements, certain resource elements could similarly be excluded from the PUCCH and PUSCH and reserved for other use. For instance, certain resource elements could be reserved to define physical random access channel (PRACH) instances in which UEs could transmit random-access requests to the access node as discussed above. And other resource elements could be reserved to carry UE-specific uplink reference signals, such as sounding reference signals, which the access node could use as basis to evaluate uplink channel quality for instance.

In practice, each access node could be interfaced with a core network 20 that provides connectivity with an external transport network 22 such as the Internet for instance. Further, separate core networks might be provided for specific purposes, such as one to support 4G service and another to support 5G service.

An example core network 20 could be a packet-switched network that supports virtual-packet tunnels or other interfaces between network nodes. As shown in FIG. 1, the core network 20 could include a user-plane subsystem 24 through which UE bearer communications could flow to and from the transport network 22, and a control-plane subsystem 26 supporting functions such as UE attachment, authentication, mobility management, and bearer management, among others. Further, the core network 20 could include an element management system (EMS) 28, which could be a computing-system platform configured to operate as a central repository of operational data for the wireless communication network and to control and manage operation of various network elements.

FIG. 1 also illustrates a number of UEs 30 that may be within coverage of the various cells 14 from time to time and may seek to establish connectivity in those cells. Each of these UEs could take any of the forms noted above among other possibilities.

When each such UE enters into this system, the UE could scan for coverage, namely to find a cell in which the UE receives threshold strong signal strength. In practice, for instance, the UE could scan various carriers in search of synchronization signals, and for each carrier on which the UE detects synchronization signals, the UE could then read system messages broadcast in the cell and can measure strength of the cell's reference signal, as a reference signal receive power (RSRP) for instance. Normally, if the UE detects multiple such cells each having RSRP that is at least as high as a predefined threshold level, the UE may then select the cell having the highest such RSRP and work to establish a connection in that cell.

As noted above, for instance, to connect with the access node in a given cell, the UE could first engage in random-access messaging with the access node, and the UE and access node could then engage in an RRC-connection-establishment process. In the example RRC-connection-establishment process as noted above, the UE would transmit to the access node an RRC Connection Request message, the access node would respond to the UE with an RRC Connection Setup message, and the UE would complete the process by responding to the access node with an RRC Connection Setup Complete message.

Assuming the UE successfully establishes an RRC connection with the access node in the cell, the UE may also engage in an attachment or registration process to register for service with the core network 22. For instance, the UE could transmit an attach request or register request via access node and into the control-plane subsystem 26 of the core network 20, and the control-plane subsystem 26 could responsively work to set up bearer connectivity for the UE through the user-plane subsystem 24 of the core network. And with this bearer connectivity set up, the access node could then serve the UE with wireless packet-data communications in the cell, scheduling data communications to the UE on downlink PRBs of the cell and scheduling data communications from the UE on uplink PRBs of the cell.

Note also that, once the UE has connected with a given cell, that cell may function as the UE's primary cell (e.g., an anchor cell) in a carrier-aggregation arrangement or a dual-connectivity arrangement. As to carrier-aggregation, for instance, the cell could be a primary cell (PCell) of the UE's connection, and the access node that serves the UE on that cell might add one or more additional cells as secondary cells (SCells) to the UE's connection. And as to dual-connectivity, the cell could be an anchor cell, and the access node that serves the UE on that cell might coordinate establishment for the UE of a co-existing secondary connection with another access node. For instance, if the UE connects with a 4G cell provided by a 4G eNB, that cell might be the UE's anchor cell, and the 4G eNB might coordinate setup for the UE of a co-existing secondary connection with a 5G cell provided by a 5G gNB, so that the UE could then be served with 4G-5G dual connectivity (e.g., EUTRA-NR Dual Connectivity (EN-DC)).

As further noted above, once the UE has successfully established an RRC connection in a cell provided by an access node, if the UE then loses synchronization with the access node in that cell, the UE may need to re-connect with the access node in the cell, as another form of RRC connection establishment, namely RRC connection reestablishment. As described above, in the example RRC-connection-reestablishment process, the UE would transmit to the access node an RRC Connection Reestablishment Request, the access node would respond to the UE with an RRC Connection Reestablishment response message, and the UE would complete the process by responding to the access node with an RRC Connection Reestablishment Complete message.

Still further, as noted above, the UE and access node could consider the RRC-connection-establishment process, whether for initial RRC connection establishment or RRC connection reestablishment, to have failed in various circumstances. For instance, the UE and access node could deem the process to have failed if the process is not completed within a defined maximum time period. And further or alternatively, the UE and access node could deem the process to have failed if transmission of a given message in the process, such as the UE's RRC Connection Request message or the UE's RRC Connection Reestablishment Request message, does not succeed after a defined maximum number of allowed transmission attempts.

When a UE engages in an RRC-connection-establishment process with an access node in a cell, whether for initial RRC connection establishment or for RRC connection reestablishment, if the RRC-connection establishment process fails, the access node could record that failure as an instance of RRC-connection-establishment failure for the cell, perhaps with a timestamp indicating when the failure occurred. Further, the access node could report that instance of failure to EMS 28, and the EMS 28 could likewise record the failure as an instance of RRC-connection-establishment failure for the cell, also with a timestamp indicating the time of failure.

As noted above, the present disclosure provides for making use of such RRC-connection-establishment-failure data on a per cell basis as a basis to control which cell a given UE will be connected with.

In an example implementation, for instance, the extent of RRC-connection-establishment failure that has occurred respectively in each cell could be considered a characteristic of the cell, and that characteristic could be used as a basis to control whether a UE would be connected with the cell (i.e., with the access node that provides the cell). A representative measure of a cell's extend of RRC-connection-establishment failure could be an RRC-connection-establishment-failure rate, defining the number of instances of RRC-connection-establishment failure that have occurred in the cell per unit time, perhaps over a recent sliding window of time and/or historically typical for the current time of day or the like.

Through this process, RRC-connection-establishment failure experienced by one or more UEs in an access node's cell could usefully form the basis for controlling whether another UE, not among the one or more UEs, would be connected with the cell. For instance, the cell's historical rate of RRC-connection-establishment failures could be based on one or more instances of RRC-connection-establishment failure experienced in the cell by at least one or more first UEs, and that rate of RRC-connection-establishment failure could form a basis for controlling whether a second UE, not included in the one or more first UEs, would be connected with the cell. This process can therefore be distinguished from merely considering a UE's own RRC-connection-establishment failure in the cell as a basis to control whether the UE itself with be connected with that cell.

This process could be carried out in various ways, as noted above for instance.

In one implementation, a UE could carry out the process as a basis to decide and control which of various candidate cells the UE should connect with. For instance, in a scenario where the UE discovers threshold strong coverage of each of at least two cells with which the UE could connect, the UE could consider each cell's respective RRC-connection-establishment failure history as a basis to select one of the cells with which to connect, and the UE could then accordingly connect with that cell.

To facilitate this implementation, a system broadcast message such as a SIB message broadcast respectively in each cell could specify or otherwise indicate the cell's RRC-connection-establishment failure rate. Each access node could provide this indication in a SIB information element, based on the access node's records of instances of RRC-connection-establishment failure in the cell and/or based on information from the EMS 28.

When the UE discovers threshold strong enough coverage of at least two such cells, the UE could thus read the SIB message broadcast respectively in each cell in order to determine each cell's respective RRC-connection-establishment failure rate. And the UE could use that RRC-connection-establishment failure rate data as a basis to decide and control which cell the UE will connect with.

By way of example, the UE could select a first such cell rather than a second such cell on grounds that the first cell's RRC-connection-establishment failure rate is threshold low, i.e., at least as low as a predefined low threshold level, and/or that the second cell's RRC-connection-establishment failure rate is threshold high, i.e., at least as high as a predefined high threshold level. And as another example, the UE could select the first cell rather than the second cell on grounds that the first cell's RRC-connection-establishment failure rate is threshold lower than the second cell's RRC-connection-establishment failure rate. Further, the UE could factor in relative signal strength of these cells, and/or other factors, as well.

As a further specific example, if the UE is faced with a choice of whether to connect with a first cell that operates in accordance with a first RAT (e.g., 4G LTE) (a "first-RAT cell") or rather to connect with a second cell that operates in accordance with a second RAT (e.g., 5G NR) (a "second-RAT cell"), the UE might be configured by default to connect with the first-RAT cell. But based at least on the UE determining that the first-RAT cell's RRC-connection-establishment failure rate is threshold high and/or that the second-RAT cell's RRC-connection-establishment failure rate is threshold low, the UE may instead decide to connect with the second-RAT cell.

In another implementation, an access node could carry out the process as a basis to decide and control which of various cells a UE should be connected with. For instance, in a scenario where the UE is connected with a cell provided by the access node, e.g., as the UE's sole or primary/anchor serving cell and where the UE reports to the access node that the UE is within threshold strong coverage of both that cell and another cell, the access node could consider each cell's respective RRC-connection-establishment failure history as a basis to decide whether to have the UE transition to be connected instead with the other cell.

To facilitate this implementation, the access node could determine the RRC-connection-establishment failure rate of its own cell based on its own records and/or information from the EMS 28, and the access node could determine the RRC-connection-establishment failure rate of the other cell by referring to associated data. For instance, if the other cell is also provided by the same access node, the access node could refer to its own records to determine the other cell's RRC-connection-establishment failure rate. Or if the other cell is provided by another access node, the access node could query the EMS 28 or the other access node to determine the other cell's RRC-connection-establishment failure rate.

Faced with a choice of whether the UE should remain connected with a first cell or should rather transition to be connected with a second cell, the access node could select the first cell rather than the second cell on grounds that the first cell's RRC-connection-establishment failure rate is threshold low and/or that the second cell's RRC-connection-establishment failure rate is threshold high. And as another example, the access node could select the first cell rather than the second cell on grounds that the first cell's RRC-connection-establishment failure rate is threshold lower than the second cell's RRC-connection-establishment failure rate. Further, the access node could consider other factors as well.

If the access node decides that the UE should continue being connected with the cell with which the UE is connected, then no further action is necessary. Whereas, if the access node decides that the UE should transition to be connected instead with the other cell, then the access node could engage in signaling to effect that transition. For instance, the access node could transmit to the UE an RRC connection reconfiguration message that directs the UE to engage in the transition. If the other cell is also provided by the same access node, then this transition would be a change of the UE's existing RRC connection with the access node. Whereas, if the other cell is provided by a different access node, then the RRC connection reconfiguration message could include a release-and-redirect command that causes the UE to release its RRC connection with the access node and to instead work to connect with the other access node.

Figure 2:
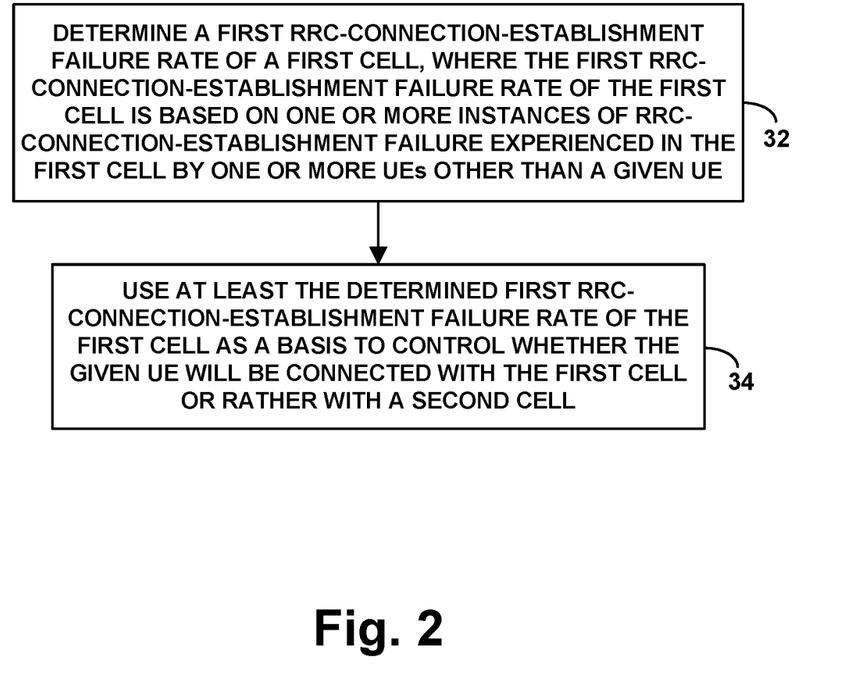
FIG. 2 is a flow chart depicting a method that could be carried out in accordance with the disclosure.

FIG. 2 is a flow chart depicting a method that could be carried out in accordance with the present disclosure, to control connectivity in a wireless communication system that includes a first cell and a second cell, when the first cell and the second cell are both candidates to serve a given UE. As shown in FIG. 2, at block 32, the method includes determining a first RRC-connection-establishment failure rate of the first cell, where the first RRC-connection-establishment failure rate of the first cell is based on one or more instances of RRC-connection-establishment failure experienced in the first cell by one or more UEs other than the given UE. And at block 34 the method includes using at least the determined first RRC-connection-establishment failure rate of the first cell as a basis to control whether the given UE will be connected with the first cell or rather with the second cell.

In line with the discussion above, the act of using at least the determined first RRC-connection-establishment failure rate of the first cell as a basis to control whether the given UE will be connected with the first cell or rather with the second cell could involve (i) determining that the determined first RRC-connection-establishment failure rate of the first cell is at least as high as a predefined threshold level and (ii) based at least on the determining that the determined first RRC-connection-establishment failure rate of the first cell is at least as high as the predefined threshold level, causing the given UE to be connected with the second cell rather than with the first cell.

Alternatively, the act of using at least the determined first RRC-connection-establishment failure rate of the first cell as a basis to control whether the given UE will be connected with the first cell or rather with the second cell could involve (i) determining that the determined first RRC-connection-establishment failure rate of the first cell is at least as low as a predefined threshold level and (ii) based at least on the determining that the determined first RRC-connection-establishment failure rate of the first cell is at least as low as the predefined threshold level, causing the given UE to be connected with the first cell rather than with the second cell.

Further, as discussed above, the method could additionally include determining a second RRC-connection-establishment failure rate of the second cell, where the second RRC-connection-establishment failure rate of the second cell is based on one or more instances of RRC-connection-establishment failure experienced in the second cell by one or more UEs other than the given UE.

And in that case, the act of using at least the determined first RRC-connection-establishment failure rate of the first cell as a basis to control whether the given UE will be connected with the first cell or rather with the second cell could then include using at least both the determined first RRC-connection-establishment failure rate of the first cell and the determined second RRC-connection-establishment failure rate of the second cell as the basis to control whether the given UE will be connected with the first cell or rather with the second cell.

Still further, the act of using at least both the determined first RRC-connection-establishment failure rate of the first cell and the determined second RRC-connection-establishment failure rate of the second cell as the basis to control whether the given UE will be connected with the first cell or rather with the second cell could involve (i) determining that the determined first RRC-connection-establishment failure rate of the first cell is higher than the determined second RRC-connection-establishment failure rate of the second cell and (ii) based at least on the determining that the determined first RRC-connection-establishment failure rate of the first cell is higher than the determined second RRC-connection-establishment failure rate of the second cell, causing the given UE to be connected with the second cell rather than with the first cell.

In addition, the act of determining that the determined first RRC-connection-establishment failure rate of the first cell is higher than the determined second RRC-connection-establishment failure rate of the second cell could involve determining that the determined first RRC-connection-establishment rate of the first cell is at least a predefined delta higher than the determined second RRC-connection-establishment failure rate of the second cell.

As further discussed above, the act of using at least the determined first RRC-connection-establishment failure rate of the first cell as a basis to control whether the given UE will be connected with the first cell or rather with the second cell could involve using at least the determined first RRC-connection-establishment failure rate of the first cell as a basis to control which of the first cell and second cell will be a primary cell of the given UE. And the primary cell could be for a service arrangement such as carrier aggregation (with the primary cell being a PCell) and/or dual connectivity (with the primary cell being an anchor cell), among other possibilities.

Yet further, as discussed above, the method could be carried out by the given UE. And in that case, the act of determining the first RRC-connection-establishment failure rate of the first cell could involve the given UE reading an indication of the first RRC-connection-establishment failure rate of the first cell from a system message broadcast in the first cell. And the determining and using operations could be carried out when the UE is within strong enough coverage of both the first cell and second cell to support the UE being connected with either the first cell or the second cell.

Alternatively or additionally, as discussed above, the method could be carried out by an access node that provides the first cell and could be carried out when the UE is connected with the access node in the first cell. And in that case, the act of using at least the determined first RRC-connection-establishment failure rate of the first cell as a basis to control whether the given UE will be connected with the first cell or rather with the second cell could involve using at least the determined first RRC-connection-establishment failure rate of the first cell as a basis to control whether to cause the UE to transition from being connected with the first cell to instead being connected with the second cell.

Figure 3:
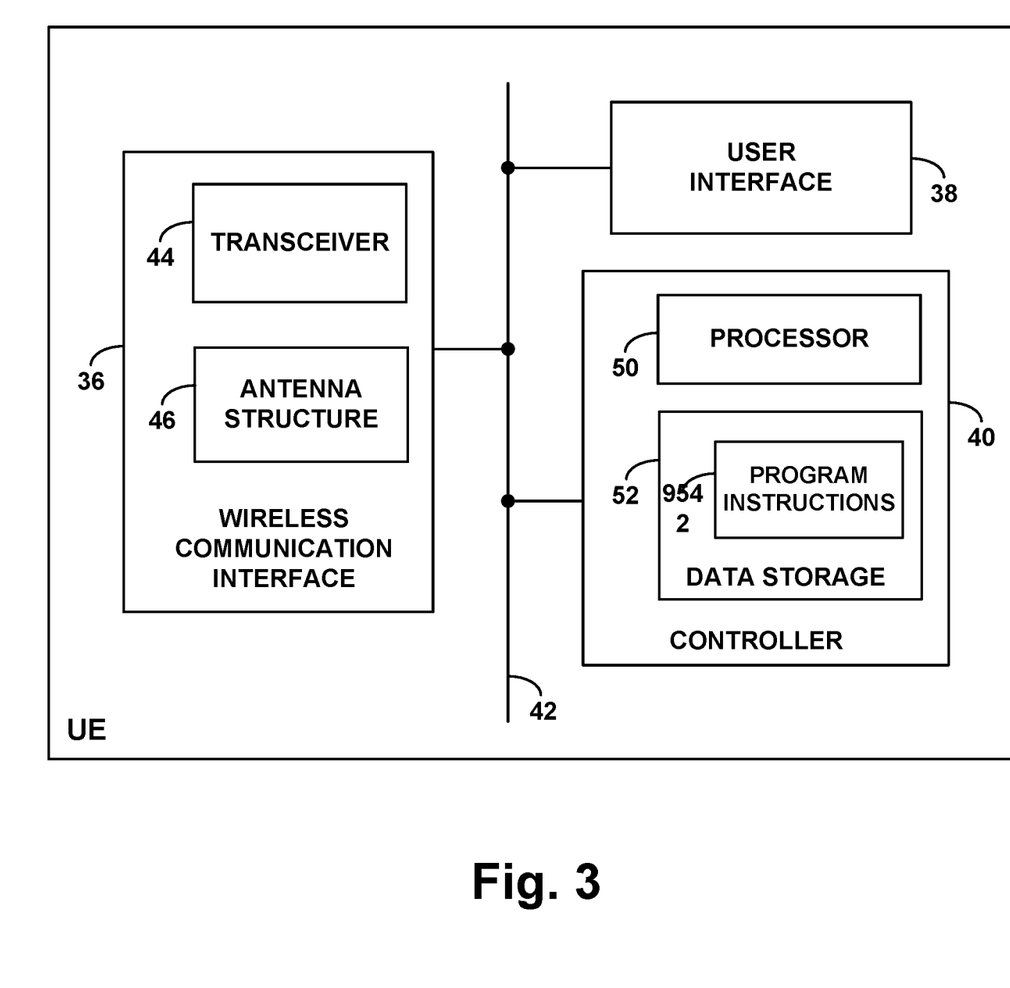
FIG. 3 is a simplified block diagram of an example UE operable in accordance with the disclosure.
Figure 4:
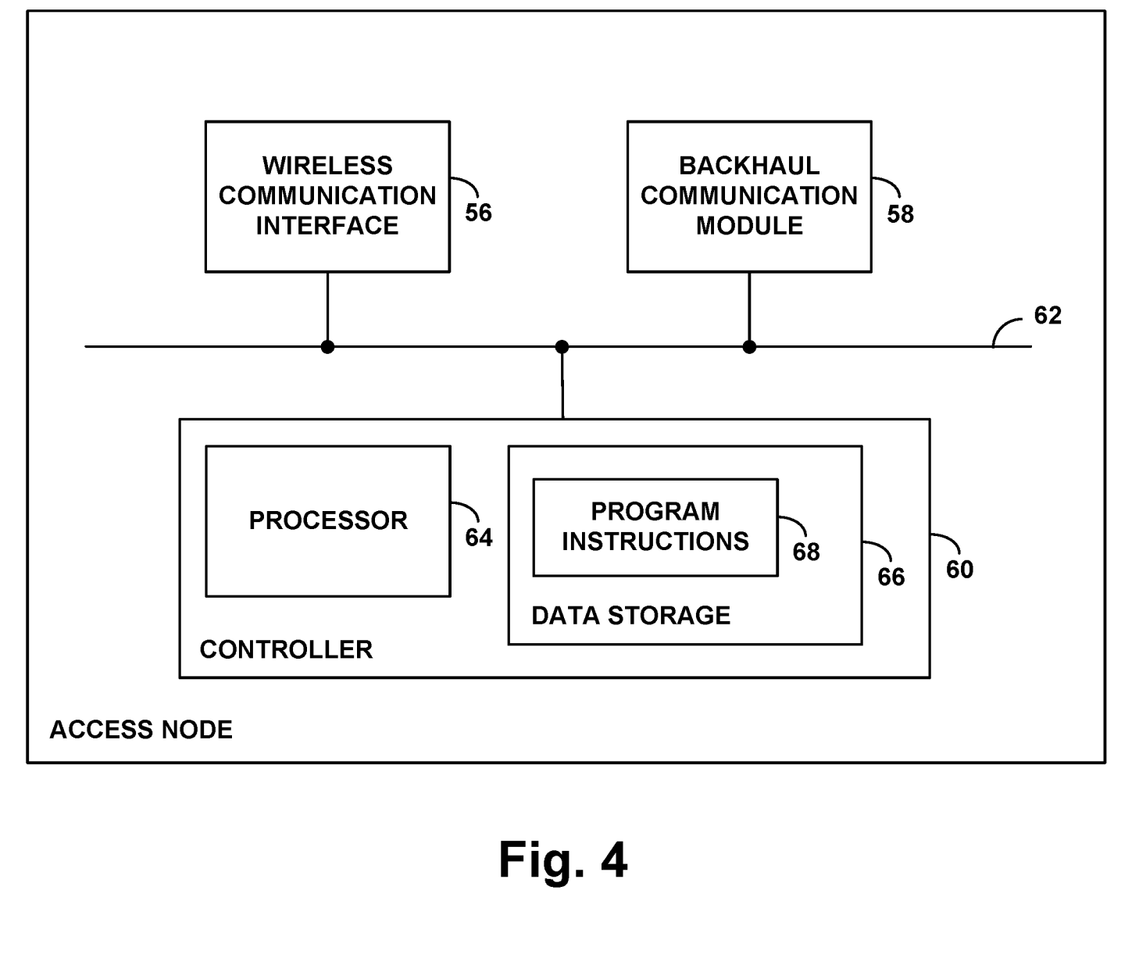
FIG. 4 is a simplified block diagram of an example access node operable in accordance with the disclosure.

FIG. 3 is next a simplified block diagram of an example UE that could be configured to operate in accordance with the present disclosure. As shown in FIG. 4, the example UE includes a wireless communication interface 36, a user interface 38, and a controller 40, which could be integrated together and/or communicatively linked together by a system bus, network, or other connection mechanism 42.

The wireless communication interface 36 could operate to support and thus facilitate air-interface communication with an access node, as discussed above. As such, the wireless communication interface 80 could include at least one transceiver 44 and at least one antenna structure 46 that supports air-interface communication. Further, the user interface 38, which could be included if the UE is user operated, could include input and output components (not shown) to facilitate interaction with a user.

The controller 40, which could be integrated with the wireless communication interface 36 (e.g., on a common chipset) or provided in another manner, could then operate to carry out or cause the UE to carry out various operations described herein.

As shown, for instance, the controller 40 could include at least one processor 50 (e.g., (e.g., one or more general purpose processors and/or specialized processors), non-transitory data storage 52 (e.g., one or more volatile and/or non-volatile storage components (e.g., magnetic, optical, or flash storage, necessarily non-transitory)), and program instructions 54 held in the data storage 52 and executable by the processor to cause the UE to carry out operations for controlling whether the UE will be connected with a first cell or rather with a second cell when both the first cell and the second cell are candidates to serve the UE.

In line with the discussion above, the operations could include determining a first RRC-connection-establishment failure rate of the first cell, where the first RRC-connection-establishment failure rate of the first cell is based on one or more instances of RRC-connection-establishment failure experienced in the first cell by UEs other than the UE. And the operations could include using at least the determined first RRC-connection-establishment failure rate of the first cell as a basis to control whether the UE will be connected with the first cell or rather with the second cell.

Various other features discussed herein can be implemented in this context as well, and vice versa.

Finally, FIG. 4 is a simplified block diagram of an example access node that could be configured to carry out various features described herein. As shown in FIG. 4, the example access node includes a wireless communication interface 56, a backhaul communication interface 58, and a controller 60, all of which could be integrated together and/or communicatively linked together by a system bus, network, or other connection mechanism 62.

In an example implementation, the wireless communication interface 56 could support air-interface communication and may therefore comprise an antenna structure, which could be tower mounted or could take other forms, and associated components such as a power amplifier and a wireless transceiver, so as to facilitate providing one or more cells in which the access node could serve UEs. And the backhaul communication interface 58 could comprise a wired or wireless communication module, such as an Ethernet network communication module and associated logic, through which the access node could engage in backhaul communication with various other network entities.

Further, the controller 60 could be configured to carry out various operations described herein, to control whether a UE that is connected with a first cell provided by the access node should connect instead with a second cell.

For instance, as shown, the controller 60 could include at least one processor 64, such as one or more processors (e.g., one or more general purpose processors and/or specialized processors), and a non-transitory data storage 66 (e.g., one or more volatile and/or non-volatile storage components (e.g., magnetic, optical, or flash storage, necessarily non-transitory)) storing program instructions 68 executable by the at least one processor 64 to carry out those operations (e.g., to cause the access node to carry out the operations).

And in line with the discussion above, the operations could include determining a first RRC-connection-establishment failure rate of the first cell, wherein the first RRC-connection-establishment failure rate of the first cell is based on one or more instances of RRC-connection-establishment failure experienced in the first cell by UEs other than the UE. Further, the operations could include using at least the determined first RRC-connection-establishment failure rate of the first cell as a basis to control whether the UE should transition from being connected with the first cell to being connected instead with the second cell.

Various other features discussed herein can be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling connectivity in a wireless communication system comprising a first cell and a second cell, the method comprising, when the first cell and the second cell are both candidates to serve a given user equipment device (UE):
    determining a first Radio-Resource-Control (RRC)-connection-establishment failure rate of the first cell, wherein the first RRC-connection-establishment failure rate of the first cell is based on one or more instances of RRC-connection-establishment failure experienced in the first cell by one or more UEs other than the given UE;
    determining a second RRC-connection-establishment failure rate of the second cell, wherein the second RRC-connection-establishment failure rate of the second cell is based on one or more instances of RRC-connection-establishment failure experienced in the second cell by one or more UEs other than the given UE; and
    using at least both the determined first RRC-connection-establishment failure rate of the first cell and the determined second RRC-connection-establishment failure rate of the second cell as a basis to control whether the given UE will be connected with the first cell or rather with the second cell.

2. The method of claim 1, wherein using at least the determined first RRC-connection-establishment failure rate of the first cell as a basis to control whether the given UE will be connected with the first cell or rather with the second cell comprises:
    determining that the determined first RRC-connection-establishment failure rate of the first cell is at least as high as a predefined threshold level;
    based at least on the determining that the determined first RRC-connection-establishment failure rate of the first cell is at least as high as the predefined threshold level, causing the given UE to be connected with the second cell rather than with the first cell.

3. The method of claim 1, wherein using at least the determined first RRC-connection-establishment failure rate of the first cell as a basis to control whether the given UE will be connected with the first cell or rather with the second cell comprises:
    determining that the determined first RRC-connection-establishment failure rate of the first cell is at least as low as a predefined threshold level;
    based at least on the determining that the determined first RRC-connection-establishment failure rate of the first cell is at least as low as the predefined threshold level, causing the given UE to be connected with the first cell rather than with the second cell.

4. The method of claim 1, wherein using at least both the determined first RRC-connection-establishment failure rate of the first cell and the determined second RRC-connection-establishment failure rate of the second cell as the basis to control whether the given UE will be connected with the first cell or rather with the second cell comprises:
    determining that the determined first RRC-connection-establishment failure rate of the first cell is higher than the determined second RRC-connection-establishment failure rate of the second cell; and
    based at least on the determining that the determined first RRC-connection-establishment failure rate of the first cell is higher than the determined second RRC-connection-establishment failure rate of the second cell, causing the given UE to be connected with the second cell rather than with the first cell.

5. The method of claim 4, wherein determining that the determined first RRC-connection-establishment failure rate of the first cell is higher than the determined second RRC-connection-establishment failure rate of the second cell comprises determining that the determined first RRC-connection-establishment rate of the first cell is at least a predefined delta higher than the determined second RRC-connection-establishment failure rate of the second cell.

6. The method of claim 1, wherein using at least the determined first RRC-connection-establishment failure rate of the first cell as a basis to control whether the given UE will be connected with the first cell or rather with the second cell comprises using at least the determined first RRC-connection-establishment failure rate of the first cell as a basis to control which of the first cell and second cell will be a primary cell of the given UE.

7. The method of claim 6, wherein the primary cell is for at least one service arrangement selected from the group consisting of carrier aggregation and dual connectivity.

8. The method of claim 1, wherein the method is carried out by the given UE.

9. The method of claim 8, wherein determining the first RRC-connection-establishment failure rate of the first cell comprises the given UE reading an indication of the first RRC-connection-establishment failure rate of the first cell from a system message broadcast in the first cell.

10. The method of claim 8, wherein the determining the first RRC-connection-establishment failure rate of the first cell and using are carried out when the UE is within strong enough coverage of both the first cell and second cell to support the UE being connected with either the first cell or the second cell.

11. The method of claim 1, wherein the method is carried out by an access node that provides the first cell, and wherein the method is carried out when the UE is connected with the access node in the first cell,
    wherein using at least the determined first RRC-connection-establishment failure rate of the first cell as a basis to control whether the given UE will be connected with the first cell or rather with the second cell comprises using at least the determined first RRC-connection-establishment failure rate of the first cell as a basis to control whether to cause the UE to transition from being connected with the first cell to instead being connected with the second cell.

12. A user equipment device (UE) comprising:
    at least one processor;
    non-transitory data storage;
    at least one transceiver; and
    at least one antenna structure supporting air-interface communication;
    wherein the non-transitory data storage holds program instructions executable by the processor to cause the UE to carry out operations for controlling whether the UE will be connected with a first cell or rather with a second cell when both the first cell and the second cell are candidates to serve the UE, the operations including:
    determining a first Radio-Resource-Control (RRC)-connection-establishment failure rate of the first cell, wherein the first RRC-connection-establishment failure rate of the first cell is based on one or more instances of RRC-connection-establishment failure experienced in the first cell by UEs other than the UE,
    determining a second RRC-connection-establishment failure rate of the second cell, wherein the second RRC-connection-establishment failure rate of the second cell is based on one or more instances of RRCconnection-establishment failure experienced in the second cell by one or more UEs other than the given UE, and using at least both the determined first RRC-connection-establishment failure rate of the first cell and the determined second RRC-connection-establishment failure rate of the second cell as a basis to control whether the UE will be connected with the first cell or rather with the second cell.

13. The UE of claim 12, wherein determining the first RRC-connection-establishment failure rate of the first cell comprises reading an indication of the first RRC-connection-establishment failure rate of the first cell from a system message broadcast in the first cell.

14. The UE of claim 12, wherein using at least the determined first RRC-connection-establishment failure rate of the first cell as a basis to control whether the UE will be connected with the first cell or rather with the second cell comprises using at least the determined first RRC-connection-establishment failure rate of the first cell as a basis to control which of the first cell and second cell will be a primary cell of the UE.

15. The UE of claim 12, wherein using at least both the determined first RRC-connection-establishment failure rate of the first cell and the determined second RRC-connection-establishment failure rate of the second cell as the basis to control whether the given UE will be connected with the first cell or rather with the second cell comprises:

determining that the determined first RRC-connection-establishment failure rate of the first cell is higher than the determined second RRC-connection-establishment failure rate of the second cell; and based at least on the determining that the determined first RRC-connection-establishment failure rate of the first cell is higher than the determined second RRC-connection-establishment failure rate of the second cell, causing the given UE to be connected with the second cell rather than with the first cell.

16. The UE of claim 15, wherein determining that the determined first RRC-connection-establishment failure rate of the first cell is higher than the determined second RRC-connection-establishment failure rate of the second cell comprises determining that the determined first RRC-connection-establishment rate of the first cell is at least a predefined delta higher than the determined RRC-connection-establishment failure rate of the second cell.

17. An access node comprising:
a wireless communication interface supporting air-interface communication;
a backhaul communication interface; and
a controller configured to carry out operations to control whether a user equipment device (UE) connected with a first cell provided by the access node should connect instead with a second cell, the operations including:

determining a first Radio-Resource-Control (RRC)-connection-establishment failure rate of the first cell, wherein the first RRC-connection-establishment failure rate of the first cell is based on one or more instances of RRC-connection-establishment failure experienced in the first cell by UEs other than the UE, determining a second RRC-connection-establishment failure rate of the second cell, wherein the second RRC-connection-establishment failure rate of the second cell is based on one or more instances of RRC-connection-establishment failure experienced in the second cell by one or more UEs other than the given UE, and using at least both the determined first RRC-connection-establishment failure rate of the first cell and the determined second RRC-connection-establishment failure rate of the second cell as a basis to control whether the UE should transition from being connected with the first cell to being connected instead with the second cell.

18. The access node of claim 17, wherein the controller comprises at least one processor, non-transitory data storage, and program instructions stored in the non-transitory data storage and executable by the at least one processor to carry out the operations.

19. The access node of claim 18, wherein using at least the determined first RRC-connection-establishment failure rate of the first cell as a basis to control whether the UE should transition from being connected with the first cell to being connected instead with the second cell comprises using at least the determined first RRC-connection-establishment failure rate of the first cell as a basis to control whether the UE will transition from having the first cell be a primary cell of the UE to having the second cell be a primary cell of the UE.

20. The access node of claim 18, wherein using at least both the determined first RRC-connection-establishment failure rate of the first cell and the determined second RRC-connection-establishment failure rate of the second cell as the basis to control whether the given UE will be connected with the first cell or rather with the second cell comprises:

determining that the determined first RRC-connection-establishment failure rate of the first cell is higher than the determined second RRC-connection-establishment failure rate of the second cell; and based at least on the determining that the determined first RRC-connection-establishment failure rate of the first cell is higher than the determined second RRC-connection-establishment failure rate of the second cell, causing the given UE to be connected with the second cell rather than with the first cell.

* * * * *